United States Patent [19]

Sternberg

[11] 4,174,514
[45] Nov. 13, 1979

[54] PARALLEL PARTITIONED SERIAL NEIGHBORHOOD PROCESSORS

[75] Inventor: Stanley R. Sternberg, Ann Arbor, Mich.

[73] Assignee: Environmental Research Institute of Michigan, Ann Arbor, Mich.

[21] Appl. No.: 919,171

[22] Filed: Jun. 26, 1978

Related U.S. Application Data

[63] Continuation-in-part of Ser. No. 742,127, Nov. 15, 1976.

[51] Int. Cl.² .............................................. G06K 9/12
[52] U.S. Cl. .......................... 340/146.3 MA; 364/200; 364/515
[58] Field of Search .......... 340/146.3 MA, 146.3 AG, 340/146.3 H, 146.3 R; 364/200 MS File, 515

[56] References Cited

U.S. PATENT DOCUMENTS

| | | | |
|---|---|---|---|
| 3,106,698 | 10/1963 | Unger | 340/146.3 R |
| 3,106,699 | 10/1963 | Kamentsky | 340/146.3 H |
| 3,196,398 | 7/1965 | Baskin | 340/146.3 H |
| 3,287,703 | 11/1966 | Slotnick | 364/200 |
| 3,289,164 | 11/1966 | Rabinow | 340/146.3 H |
| 3,339,179 | 8/1967 | Shelton, Jr. et al. | 340/146.3 H |
| 3,573,789 | 4/1971 | Sharp et al. | 340/146.3 H |
| 3,624,604 | 11/1971 | Gibbard | 340/146.3 MA |
| 3,706,071 | 12/1972 | Gray | 340/146.3 MA |
| 3,723,970 | 3/1973 | Stoller | 340/146.3 AG |
| 3,761,876 | 9/1973 | Flaherty et al. | 340/146.3 H |
| 3,846,754 | 11/1974 | Oka et al. | 340/146.3 MA |
| 3,889,234 | 6/1975 | Makihara et al. | 340/146.3 MA |
| 3,899,771 | 8/1975 | Saraga et al. | 340/146.3 MA |
| 4,003,024 | 1/1977 | Riganati et al. | 340/146.3 MA |
| 4,060,713 | 11/1977 | Golay | 364/515 |

OTHER PUBLICATIONS

Brickman, "Optical Char. Rec. With Programmable Logic Arrays", *IBM Tech. Disclosure Bulletin*, vol. 18, No. 5, Oct. 1975.

*Primary Examiner*—Leo H. Boudreau
*Attorney, Agent, or Firm*—Krass & Young

[57] ABSTRACT

Apparatus for performing neighborhood transformations on data matrices for image processing and the like achieves processing speeds greater than conventional serial processors with an economy of memory through use of a plurality of serial neighborhood processors that simultaneously operate upon adjoining partitioned segments of a single data matrix. Continuity of transformation across adjoining segment boundaries is achieved by interconnecting these serial processors to provide each processor with data contained in the contiguous matrix segment being processed by a contiguous processor when processing a data element whose neighborhood elements are partially contained in that contiguous segment.

14 Claims, 19 Drawing Figures

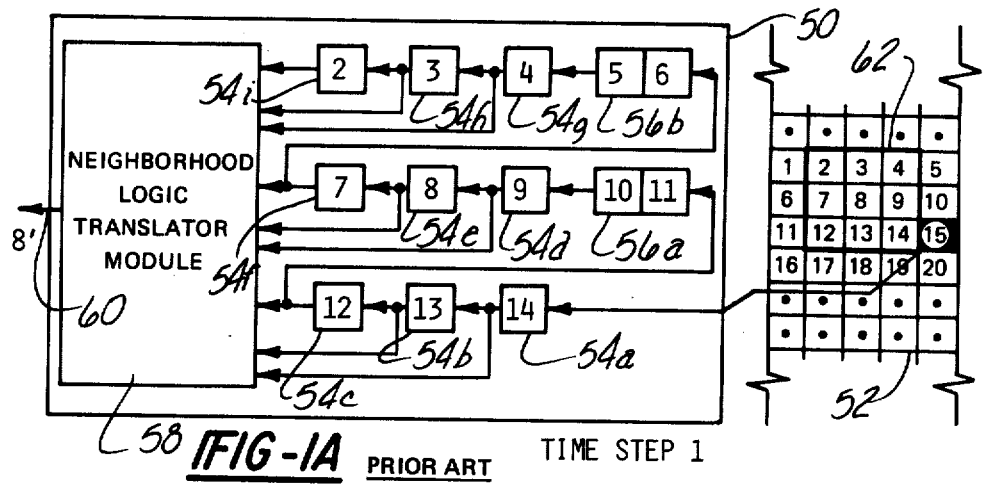
FIG-1A PRIOR ART  TIME STEP 1
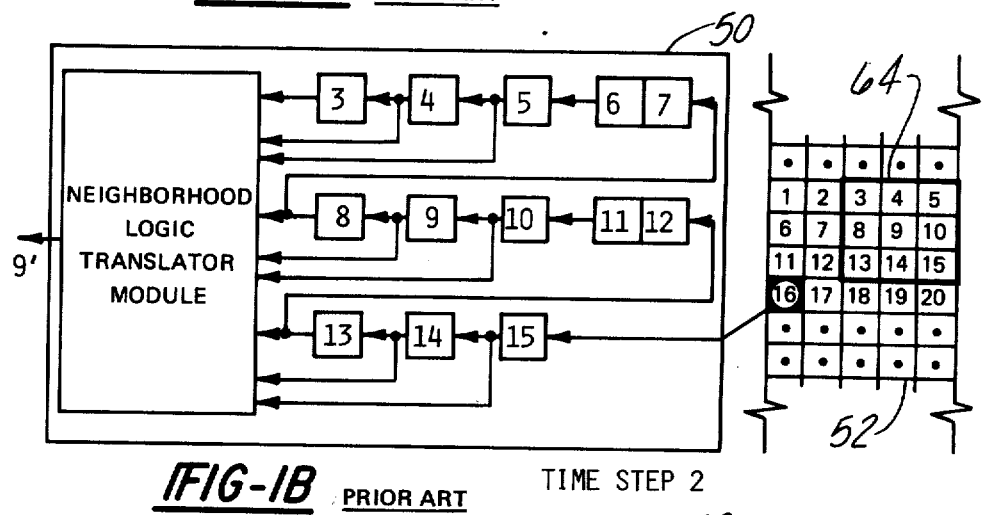
FIG-1B PRIOR ART  TIME STEP 2
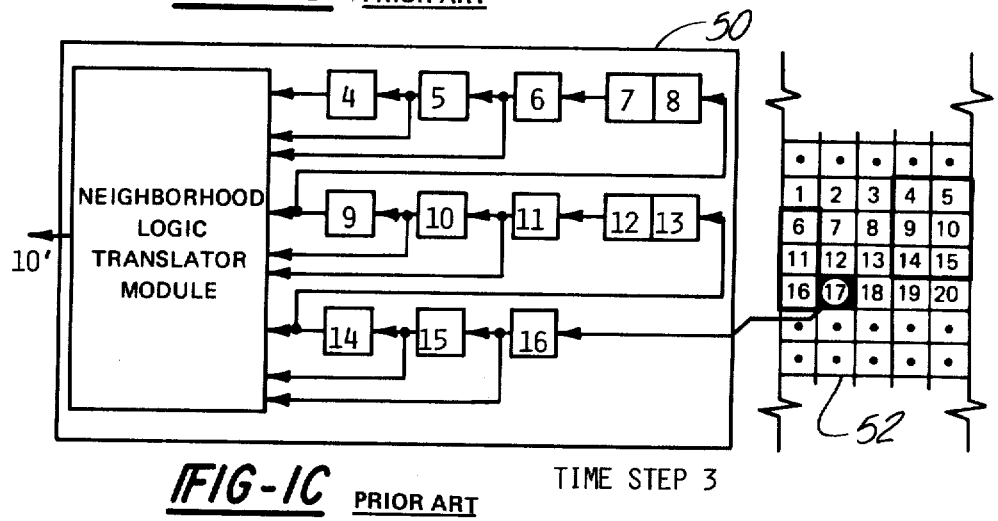
FIG-1C PRIOR ART  TIME STEP 3

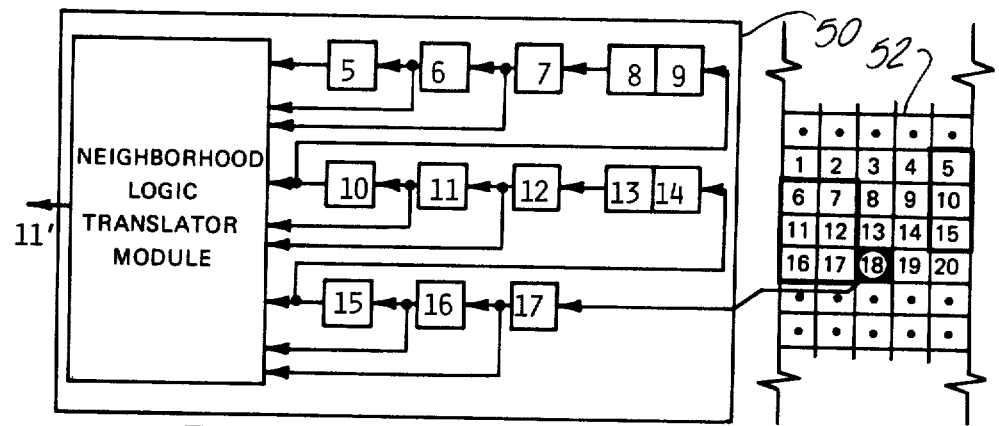
*FIG-1D* PRIOR ART    TIME STEP 4
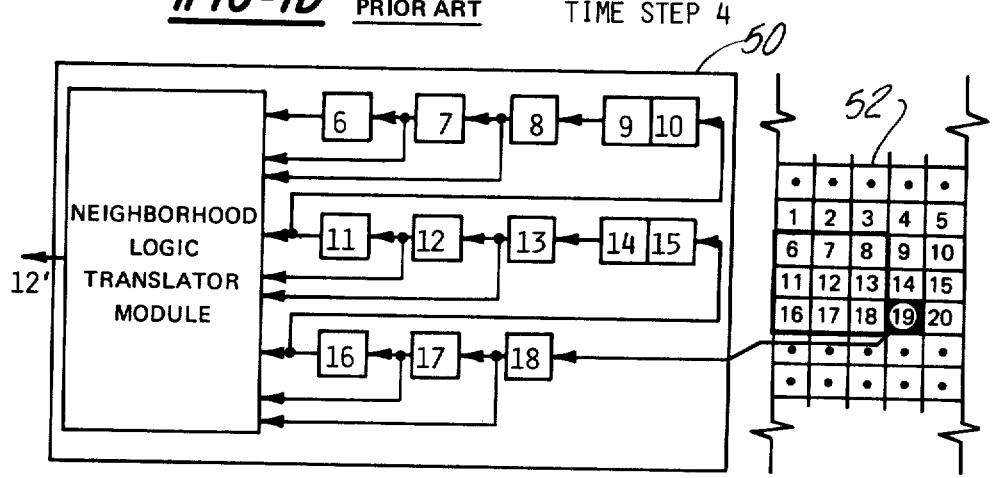
*FIG-1E* PRIOR ART    TIME STEP 5
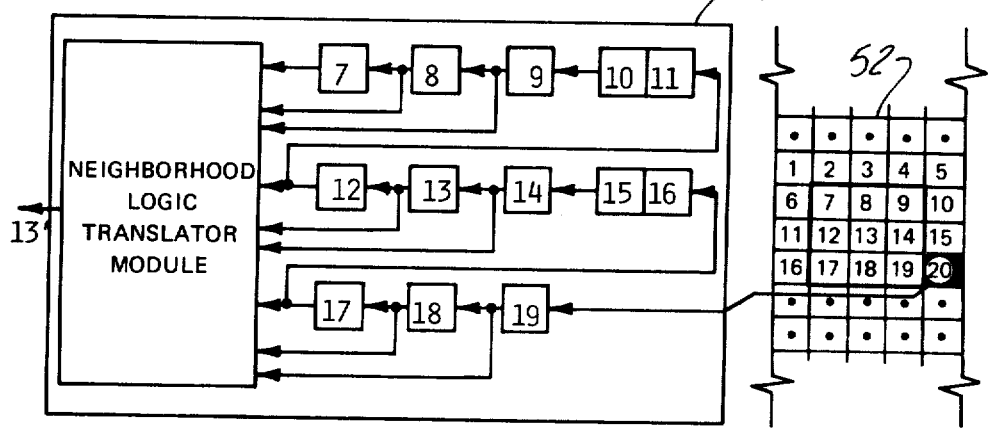
*FIG-1F* PRIOR ART    TIME STEP 6

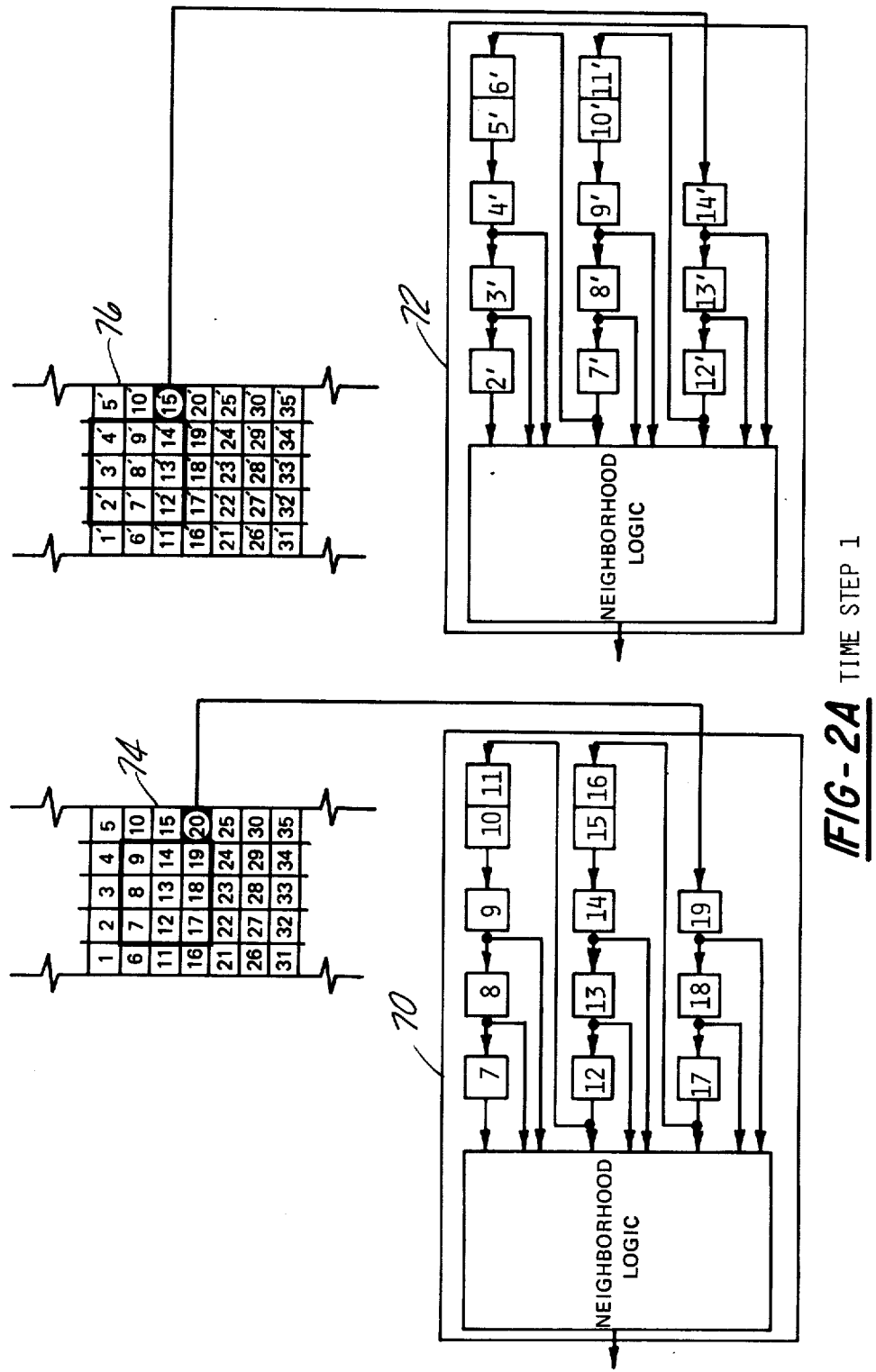
FIG-2A TIME STEP 1

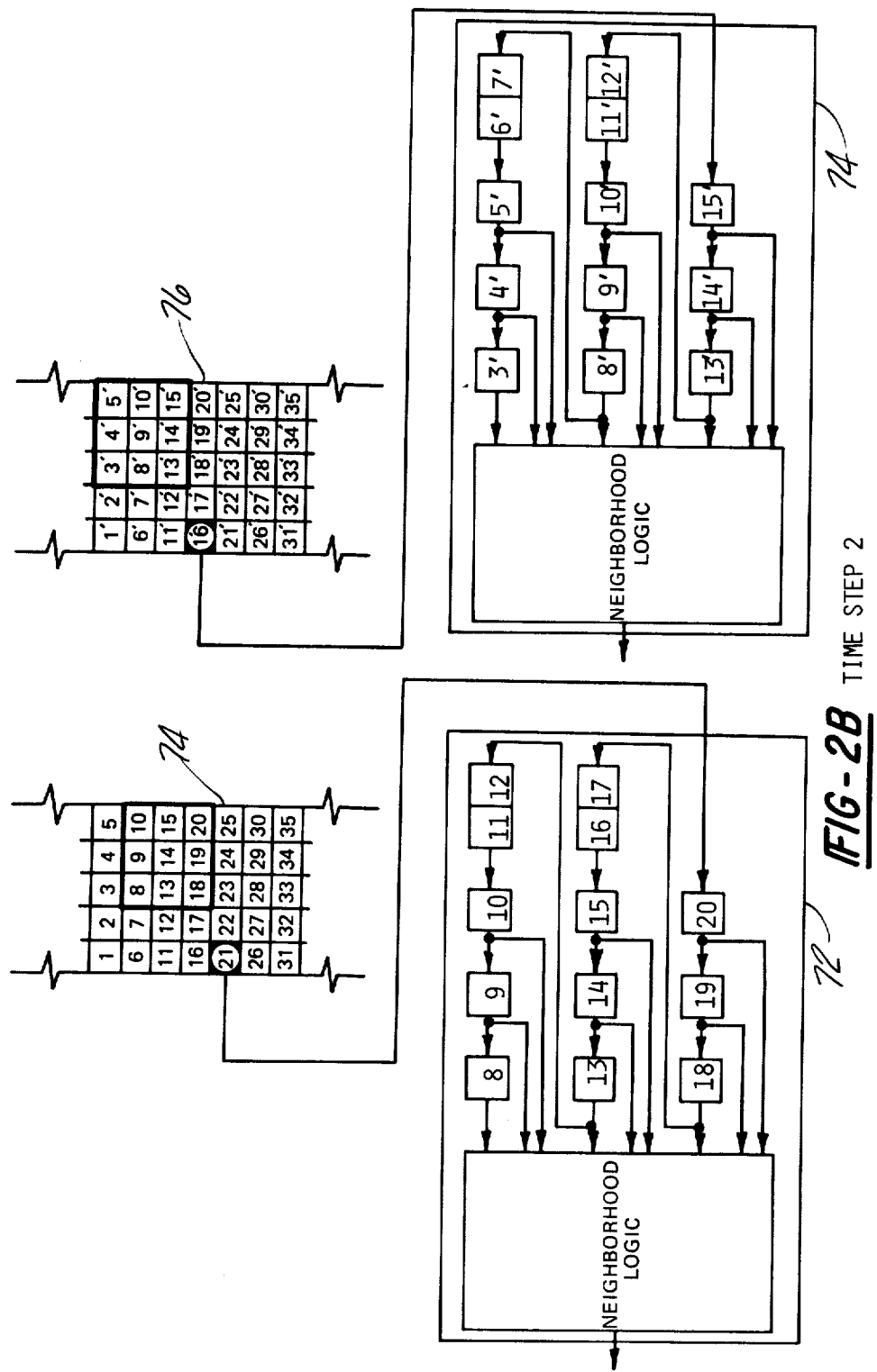
FIG-2B TIME STEP 2

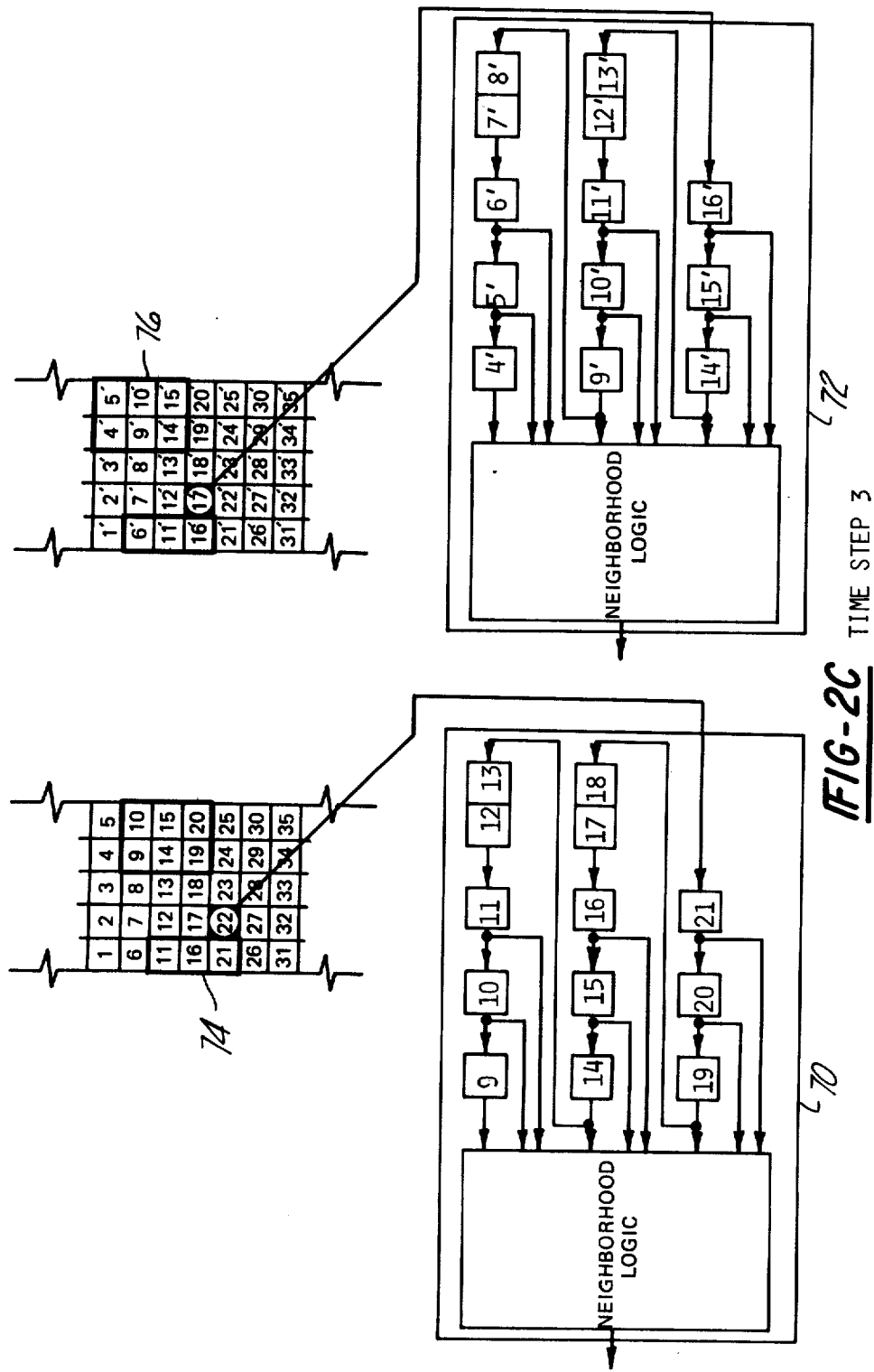
FIG-2C TIME STEP 3

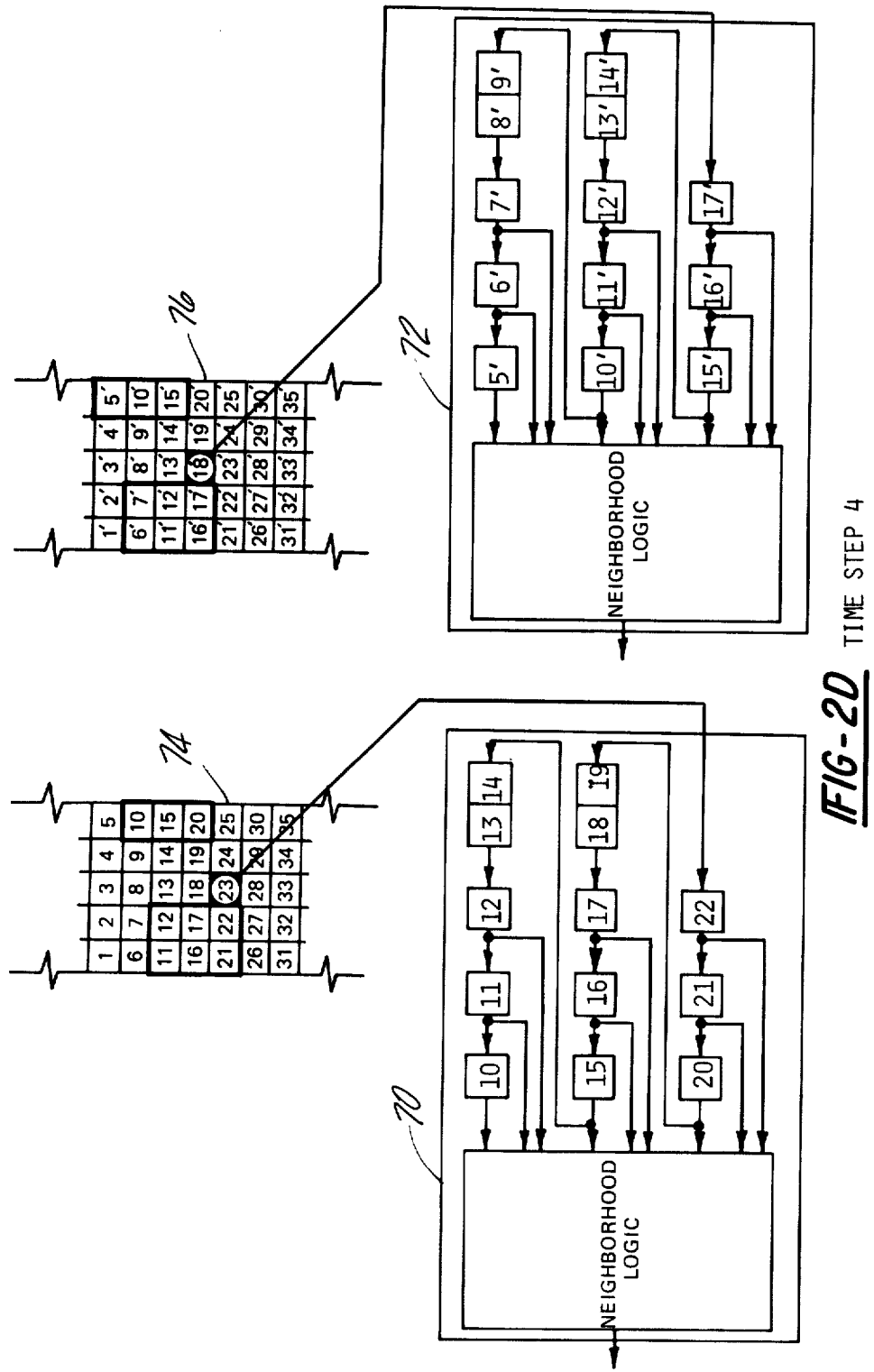
FIG-2D TIME STEP 4

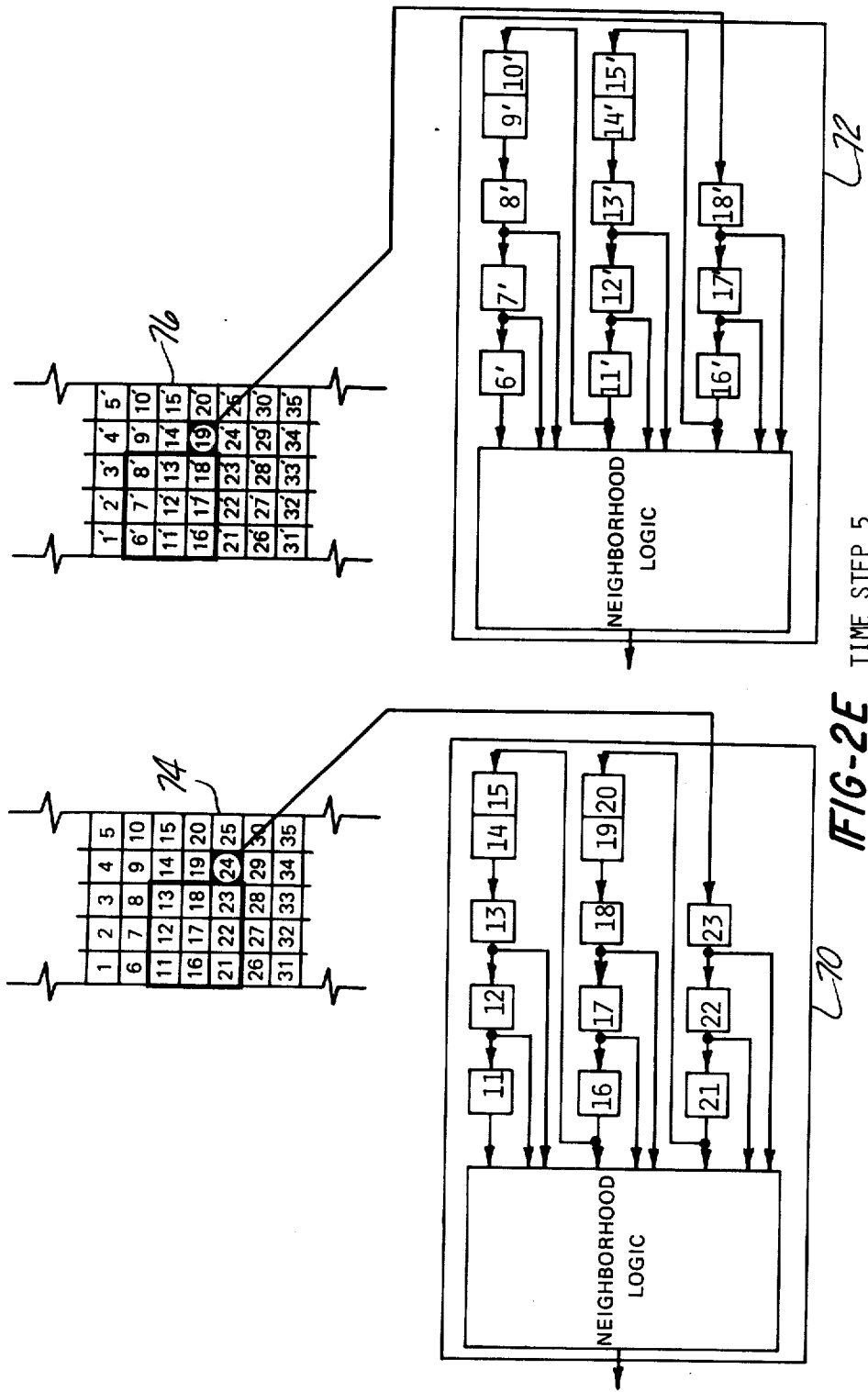

TIME STEP 1

TIME STEP 2

TIME STEP 3

TIME STEP 4

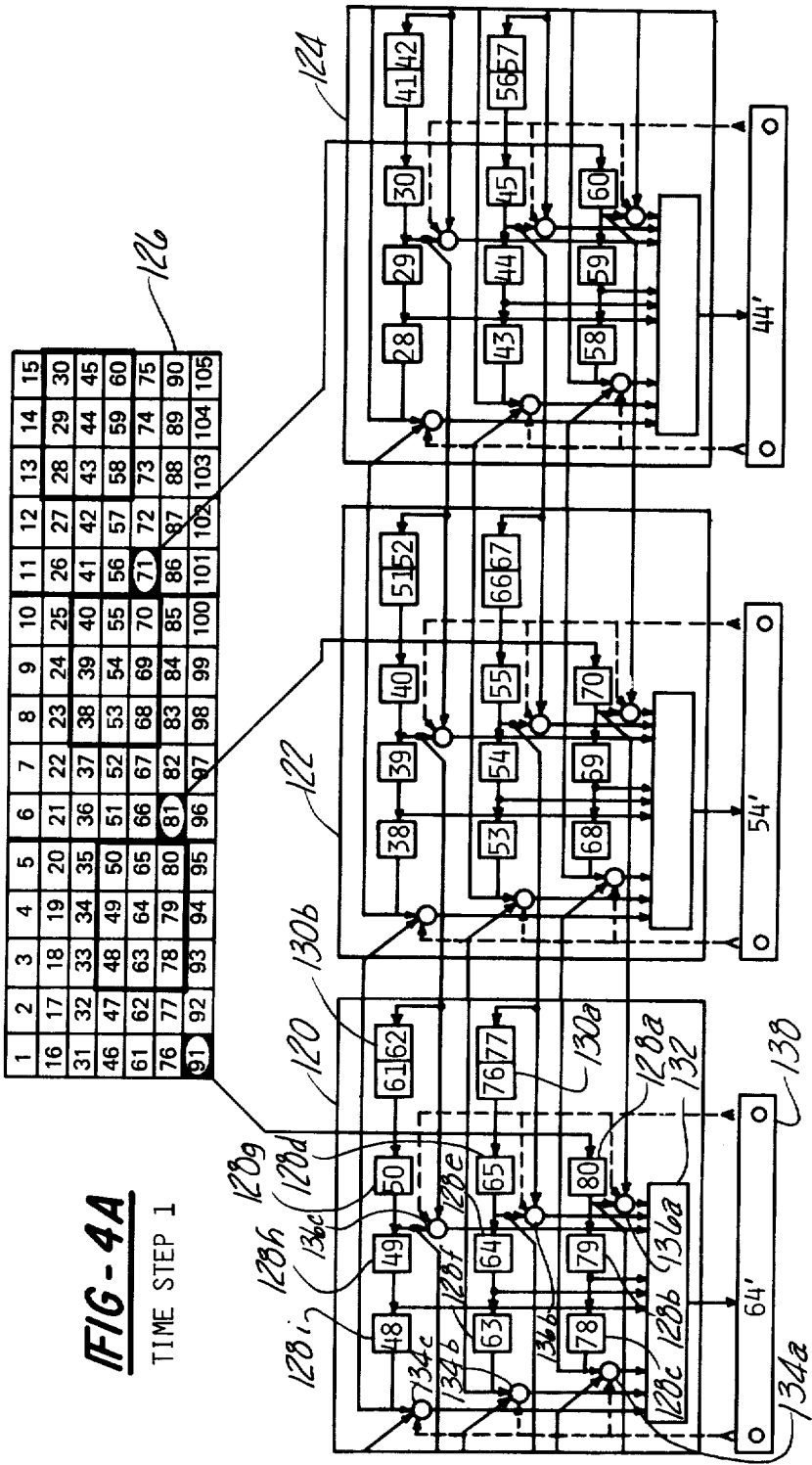

TIME STEP 2

TIME STEP 3

TIME STEP 4

PARALLEL PARTITIONED SERIAL NEIGHBORHOOD PROCESSORS

REFERENCE TO RELATED APPLICATIONS

This application is a continuation-in-part of application Ser. No. 742,127, filed Nov. 15, 1976, entitled "Automatic Image Processor".

BACKGROUND OF THE INVENTION

1. Field of the Invention

This invention relates to processors for performing neighborhood transformation on matrices of data elements for image processing and the like and more particularly, to a high speed processor containing a plurality of sections that operate upon separate sections of a single data matrix simultaneously.

2. Prior Art

Neighborhood processors are a class of devices that operate upon a first data array or matrix to generate a second matrix wherein each element has a value dependent upon the value of its equivalent element in the first matrix, and the values of its neighboring elements in the first matrix. These devices are useful for pattern recognition, image enhancement, area correlation and like image processing functions. One form of prior art neighborhood processing device is constructed in a parallel array form with a single computing element for each matrix element or pixel. A parallel array neighborhood processor of this type is disclosed in U.S. Pat. No. 3,106,698 to Unger. It comprises a matrix of identical processing cells, each cell including a memory register for storing the value of a single data element (pixel), and a neighborhood logic translator for computing the transformed value of that pixel as a function of the present value of the pixel and the neighborhood pixel values, and parallel connections between the translator and neighboring memory registers. The neighborhood logic may be fixed, in which case the same transformation is repeated indefinitely, or, may be programmable, in which case the neighborhood transition function may be modified at required times in the transition sequence of the image processing scheme. A common clock causes a simultaneous transition in the state of all the pixel values registers to achieve a transformation of the entire matrix.

The principal advantage of such a parallel array processor is speed. A neighborhood transformation of the entire image or matrix requires only a single clock pulse interval so that transformations may be performed at rates of millions per second. The principal disadvantage of the parallel array processor configuration is complexity since the neighborhood logic must be replicated in every processor cell, making a processor for large arrays, such as 1000×1000, which may be a reasonable size for a digitized image, very large and costly.

A serial array processor represents an alternative approach to neighborhood processing which greatly simplifies the processor structure at the expense of speed when compared to the parallel array. Such a system is disclosed in U.S. Pat. No. 3,339,179 to Shelton, et al. and in my U.S. patent application Ser. No. 742,127. That system employs a chain of serial neighborhood processing stages, each stage capable of generating the transformed value of a single pixel within a single clock pulse interval. The serial neighborhood processing stage employs a neighborhood logic translator identical to its counterpart in the parallel array processor cell, and line delay memory for receiving a serial pixel stream from a row by row raster scan of the input matrix and for configuring the neighborhood window by providing the appropriate matrix elements to the neighborhood logic translator. The serialized input matrix is provided to the line delay memory and the data bits are serially shifted through the line delays. When the line delay memory has been filled with input data it contains the neighborhood configuration for the first element to be transformed. Taps at appropriate positions in the line delay memory provide parallel neighborhood element values to the neighborhood logic translator. These tapped memory elements in the tapped line delay memory constitute the neighborhood window registers.

The output of a serial neighborhood processing stage occurs at the same rate as its input and has the same format. This allows the output of one stage to be provided to the input of a subsequent stage, which may perform the same or a different neighborhood logic transformation. A chain of serial neighborhood processing stages constitute a serial array processor.

The most complex section of either a serial neighborhood processor stage or of a parallel array processor cell is the neighborhood logic translator. The serial array processor is conservative of neighborhood logic translator circuitry requiring only one translator circuit per stage while a parallel array requires one translator circuit for each matrix element.

In most practical design applications where the input matrix represents an image, the matrix size must be relatively large in order to achieve high resolution. For example, when the input matrix is generated by a state-of-the-art television pick-up tube it may be digitized into a matrix of about 1,000 ×1,000 pixels. The designer of a processor for this image is faced by the choice of a parallel array processor which can generate one transformation per clock time but will have 1,000,000 relatively complex cellular elements; or a serial array processor consisting of a chain of serial processing stages, one stage for each neighborhood transformation in the image processing algorithm.

The parallel array processor transforms images at the maximal rate of one neighborhood image transformation per clock pulse interval, while the cyclic serial array processor performs image transformations at the rate of K/P image transformation per discrete time step, where P is the total number of pixels in an image and K is the number of processing stages in the serial array. For large images, the ratio of serial array processor speed to parallel array processor speed can be very small. Since processing speed can only be increased by increasing the ratio of neighborhood logic modules to the total number of data elements in the matrix, the question arises as to whether it is possible to incorporate more than one neighborhood logic module per serial processor stage, or equivalently, whether it is possible to reduce the number of line delay memory elements associated with each neighborhood logic module.

Another design problem arises from the desirability of forming the processor using integrated circuit techniques. When chains of serial image processing stages must operate on large arrays the total number of elements in the stage line delay memory may prohibit the custom integration of the processing stage circuitry on a single large scale integrated chip. When efforts are made to divide the serial processor onto a number of smaller chips the large number of interconnections between the chips frustrates the design approach.

SUMMARY OF THE INVENTION

The present invention is accordingly directed toward a unique neighborhood processor which allows the achievement of transformation rates at a wide range of levels between the extremes presented by the parallel array processor and the serial array processor. The present invention is also well adapted to be realized using integrated circuit techniques and system of the present invention can be formed of a number of identical integrated circuit modules requiring few interconnections.

Broadly, the present invention takes the form of two or more serial array processors adapted to simultaneously process separate, contiguous segments of a data matrix in such a way as to allow each processor to make use of pertinent neighborhood information stored in the opposite processor.

In its simplest configuration, which will subsequently be disclosed in detail, the present invention employs two serial array processors which equally divide the task of transforming a single data matrix. Assuming a data matrix N elements wide, the first N/2 columns of the matrix will be fed to the first serial array processor stage and the second N/2 columns will be simultaneously fed to the second serial array processor. In each case the data will be fed in a raster scan format on a half-row by half-row basis. These sequential data streams will be staggered so that one processor will always receive a pixel train delayed one row with respect to the pixel train feeding the other processor.

Each serial array processor in this pairwise configuration resembles a conventional serial processor but incorporates connections to certain of the window registers of the companion or "outboard" processor. These connections are provided by multiplexer elements, such as two-way gates, on the "inboard" processor. The multiplexer elements each have second inputs from one of the windows of the inboard processor. The outputs of the multiplexer elements go to the inboard neighborhood translator module. The multiplexer elements effectively switch either an inboard or outboard window register to the neighborhood logic depending upon the position within the matrix of the pixel for which a transformation is then being generated by the translator. If that pixel is separated from the partition of the two half matrix segments so that all of the neighbors of the pixel under consideration are in the inboard half-matrix, then the multiplexer switches the inboard window register value to the neighborhood logic module. If, however, the pixel for which a transformation is generated is adjacent to the matrix partitioning line so that some of its pertinent neighbors are in the outboard half-matrix, then the multiplexing elements are controlled to switch those outboard window register values to the neighborhood logic translator in the inboard processor.

In this manner each serial array processor makes efficient use of information stored in the other processor. The staggered feeding of the two serialized pixel streams to the two serial array processors and the multiplexing of matrix data between the two processors allow the simultaneous utilization of both serial array processors. Using the method of the present invention the data matrix may be laterally partitioned into any desired number of matrix segments which are simultaneously processed by a like number of serial array processor segments.

The serial neighborhood processing stages of the present invention may be serially chained in the same manner as conventional serial neighborhood processing stages. For example, the outputs of a pair of serial neighborhood processor stage segments formed in accordance with the present invention might be provided to a second pair of serial neighborhood processor stage segments in parallel, which perform a second transformation on the output of the first pair.

All of the serial processor array segments of the present invention are identical, and the only interconnections required between lateral segments are the relatively few window sharing connections. Accordingly, the modules of the present invention, i.e. the serial neighborhood processing stage segments could be conveniently formed as special integrated circuits and readily interconnected with one another to form a parallel partitioned serial neighborhood processing system.

Other objectives, advantages and applications of the present invention will be made apparaent by the following detailed description of several preferred embodiments of the invention. The description makes reference to the accompanying drawings in which:

FIGS. 1a through 1f illustrate the manner of operation of a serial neighborhood processing stage of the prior art;

FIGS. 2a through 2e illustrate a pair of serial neighborhood processing stages independently but synchronously operating upon separate segments of a data matrix;

Figure 3A:
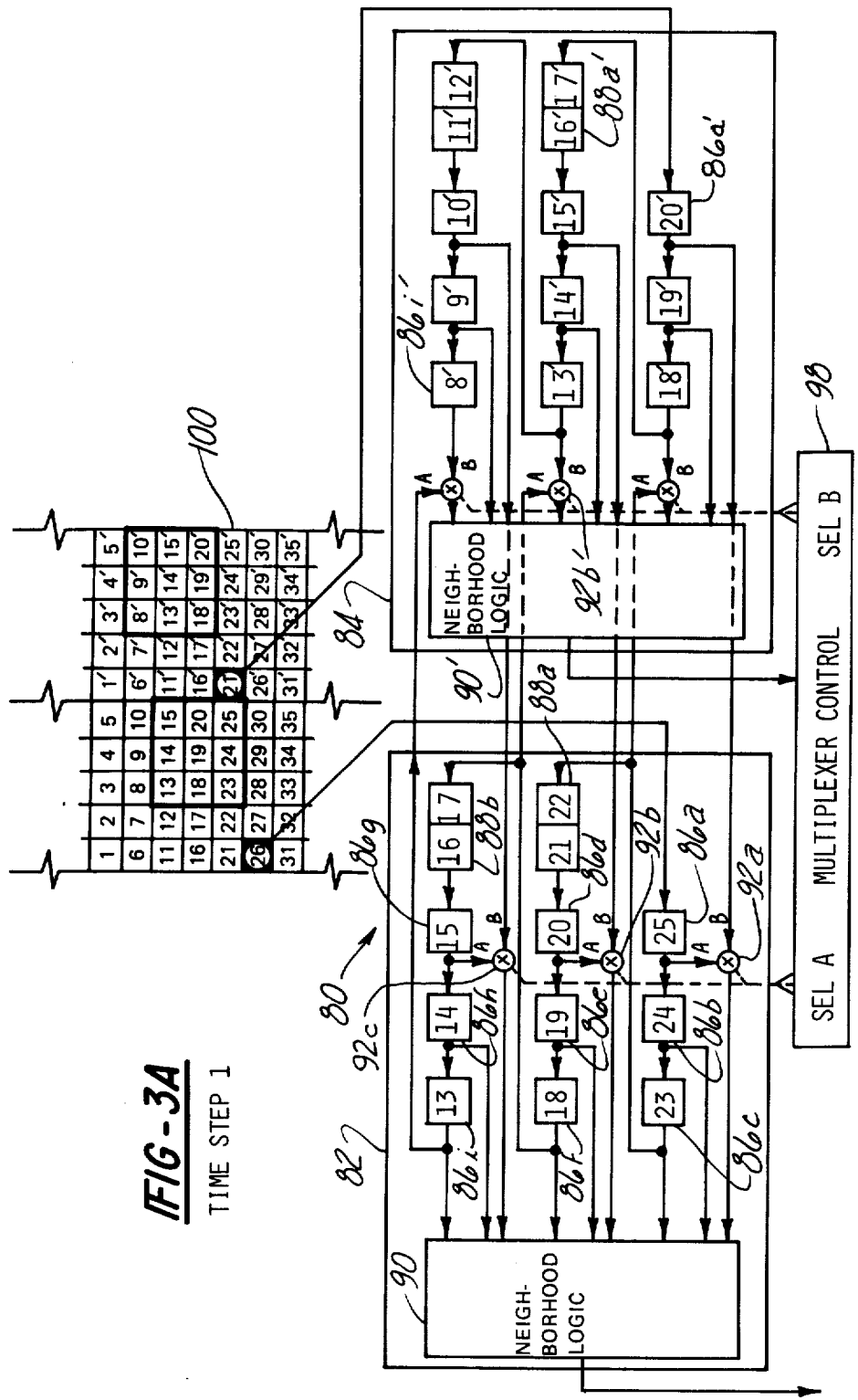
Figure 3B:
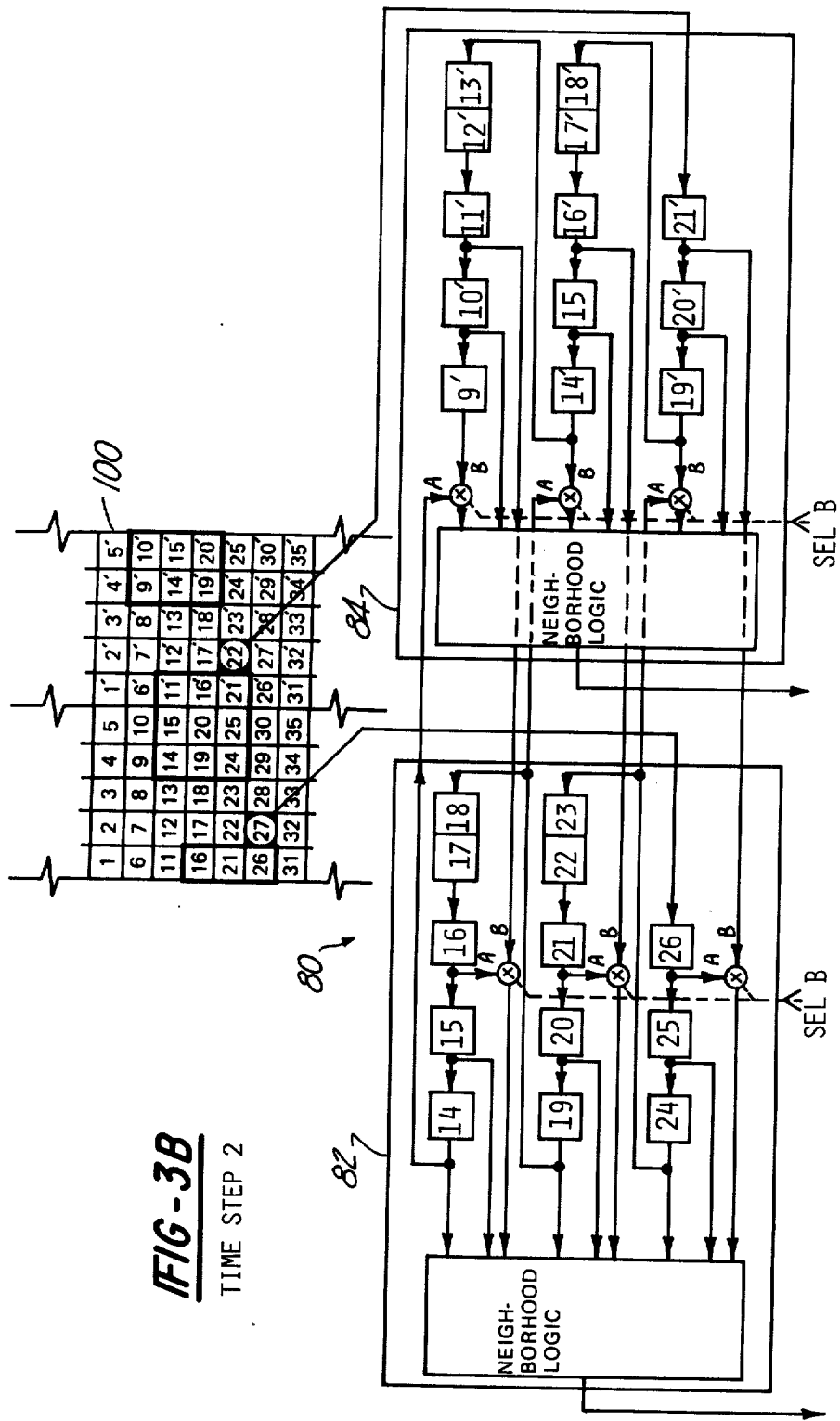

FIGS. 3a through 3d illustrate a pair of laterally connected serial neighborhood processing stage segments formed in accordance with the present invention in four consecutive stages of operation; and FIGS. 4a through 4d illustrate three laterally connected serial neighborhood processing stages formed in accordance with the present invention operating upon a triply segmented input data matrix, in four consecutive states of operation.

Referring to the drawings, FIGS. 1a through 1f illustrate a serial neighborhood processor of the prior art and its manner of operation on a data matrix to provide a foundation for the better understanding of the present invention.

In FIGS. 1a through 1f a serial neighborhood processor 50 is shown in six sequential states of operation upon a 5×4 data matrix 52 which may be considered as a section of longer matrix of the same width. The serial processor 50 is adapted to examine a 3×3 window at any clock time and to generate a transformation of the center pixel in that window; the eight immediately adjacent pixels of a particular pixel are considered its neighbors.

The neighborhood processor 50 includes nine window storage registers 54a–l. Each register is adapted to store one value of a pixel. The pixels could be limited to binary values in which case each of the registers 54 could be a binary register, or they could alternatively be multiple bit registers capable of storing pixel values of a higher order than one bit.

The window registers 54 are interconnected by a pair of shift registers 56a and 56b. Each shift register has two stages and each stage can be binary or of a higher order, depending upon the nature of the pixels forming the matrix.

It should be understood that this arrangement of shift registers and window registers is the equivalent of a single delay line with taps at the window locations.

The processor 50 further includes a neighborhood logic translator module 58 which receives the output of each of the window registers 54. The neighborhood logic module 58 has a single output line 60 which represents the transform of the pixel stored in register 54e based upon the state of all of the window registers 54. The translator module 58 includes logic (not shown) operative to receive all of the neighborhood pixel inputs and to provide an output dependent upon their states. The gate configuration may be permanently fixed, in which event the serial processor 50 ontinually performs the same transform, or it may be programmable from a center controller in the manner illustrated in my copending application Ser. No. 742,127, so that successive transforms may be performed on successive matrices. The transformations may be programmed in accordance with the principles of integral geometry to perform analysis on an image contained within a matrix and other related purposes.

The data matrix 52 is serialized by appropriate systems, well known to the prior art, not illustrated, to provide the pixels to the processor 50 on a row by row raster scan. A pixel from the matrix is provided to the window register 54a and is then serially fed, at successive clock periods, through window registers 54b, 54c, shift register 56a (two stages), window registers 54d, 54e, 54f, shift register 56b (two stages), a window registers 54g, 54h and finally window register 54i. At each clock period the next pixel in the raster scan is fed immediately behind the last pixel. At any clock period the neighborhood translator module provides as an output on line 60 the transform of the pixel then stored in register 54e. The output may be fed to another serial neighborhood processor or may be accumulated as the final output of the system. The shift registers 56a and 56b are necessary to configure the window registers and have lengths dependent upon the row lengths of the matrix.

FIG. 1a illustrates the contents of the window registers and configuring shift lines for the window 62 of the matrix. This window is centered about pixel No. 8 which is stored in register 54e at that instant. At the next clock period, as illustrated in FIG. 1b, pixel 15 will be fed to register 54a and all of the pixels will be shifted so that the window centered about pixel No. 9, will be processed. The successive stages of FIG. 1 illustrate the results of continuing shifts through the processor.

As a further step in understanding the invention, consider two serial neighborhood processing stages 70 and 72, illustrated in FIGS. 2a through 2e, operating independently on two different serialized pixel trains derived from matrices 74 and 76 respectively. The locations of the processing windows are shown at five discrete sequential time steps in FIGS. 2a through 2e. It is to be noted that the pixel stream feeding the processor 72 has been delayed one scan line from the pixel stream feeding the processor 70. In time step 3, illustrated in FIG. 2c, each processing stage window becomes disjoint, the pixel locations comprising the window occupying positions at the left and right-hand edges of the matrix. The same condition exists at time step 4 illustrated in FIG. 2d. At time step 5, illustrated in FIG. 2e, the individual window configurations are once again connected.

At time step 3, FIG. 2c, the pixels labeled 9, 10, 6', 14, 15, 11', 19, 20, 16' form a 3×3 virtual window which extends across the boundary between the two serialized pixel arrays. At time step 4, FIG. 2d, pixels 10, 6', 7', 15, 11', 12', 20, 16', 17' form a 3×3 virtual window. The virtual window is not processed by either neighborhood logic module, which, at time steps 3 and 4, are computing neighborhood transformations on disjoint window configurations. The pixels comprising the virtual window are, however, present in the combined neighborhood window registers of the two serial neighborhood processing stages. Apparatus formed in accordance with the present invention for computing a neighborhood transformation on this virtual window configuration is illustrated in FIGS. 3a through 3d. The apparatus generally indicated at 80, consists of a pair of serial neighborhood processor modules 82 and 84 which are identical to one another and are similar to the conventional serial neighborhood stage processor illustrated in FIG. 1. Each processor section 82 and 84 is adapted to operate upon a 3×3 window in a matrix five pixels wide.

The equivalent elements of processor 84 are given the same numbers as the elements of processor 82, with prime (') designations.

Processor 82 includes nine window registers 86a–i; two two-stage shift registers 88a and 88b; and a neighborhood logic translator 90. They differ from conventional serial neighborhood processors of the type illustrated in FIG. 1 in that the output of window registers 86a, 86d and 86g are provided to three multiplexing elements 92a, 92b, and 92c, respectively, rather than directly to the logic translator. The outputs of these multiplexing elements are each provided to the neighborhood logic translator 90. A second input to each of the multiplexing units 92 is provided from the equivalent window registers on the neighboring processor. For example, multiplexer 92a receives one input from its "inboard" processor register 86a and a second input from the "outboard" processor register 86a'. The multiplexer units each output one of their inputs, depending upon the nature of the signal received from a multiplexer control unit 98 which provides its output signals to all of the multiplexers. When the control signal is high the multiplexers provide a first input to their output and when the control signal is low they provide the second input signal to their output. The multiplexer control simply consists of a recirculating shift register that is cycled once each clock time. The register is loaded so that one's or zero's occur at its output in order to achieve the desired control function.

The left five columns of data matrix 100 are fed to serial neighborhood processor 82 in a row by row raster scan and the right five columns of matrix 100 are fed to processor 84 in a similar scan, delayed by one row; i.e. when the left half of the row N is being fed to processor 82 the right half of the row N-1 is being fed to processor 84.

At time step 1, FIG. 3a, the window configuration of interest covers pixels 13, 14, 15, 18, 19, 20, 23, 24 and 25. The multiplexer select input for stage 82 is A, indicating that the pixel values for the window configuration currently being transformed are contained entirely in the neighborhood window registers of inboard processor stage 82. The output of the neighborhood logic translator is the transformed value of pixel 19. At time step 2, FIG. 3b, the virtual window crosses the boundary between the two halves of data array 100. The pixel currently being transformed is pixel 20, belonging to the left half array, but its neighbors are partially in the right hand array half. Pixel values for pixels labeled 14, 15, 19, 20, 24 and 26 are contained in window registers belonging to stage 82, while pixel values of pixels labeled 11', 16' and 21' are contained in window registers belonging to stage 84. The multiplexer select input of stage 82 is therefore set to position B, causing the lateral transferral of pixel values 11', 16' and 21' into the neighborhood logic translator of stage 82. The output of stage 82 is in the neighborhood transformed value of pixel 20.

Figure 3C:
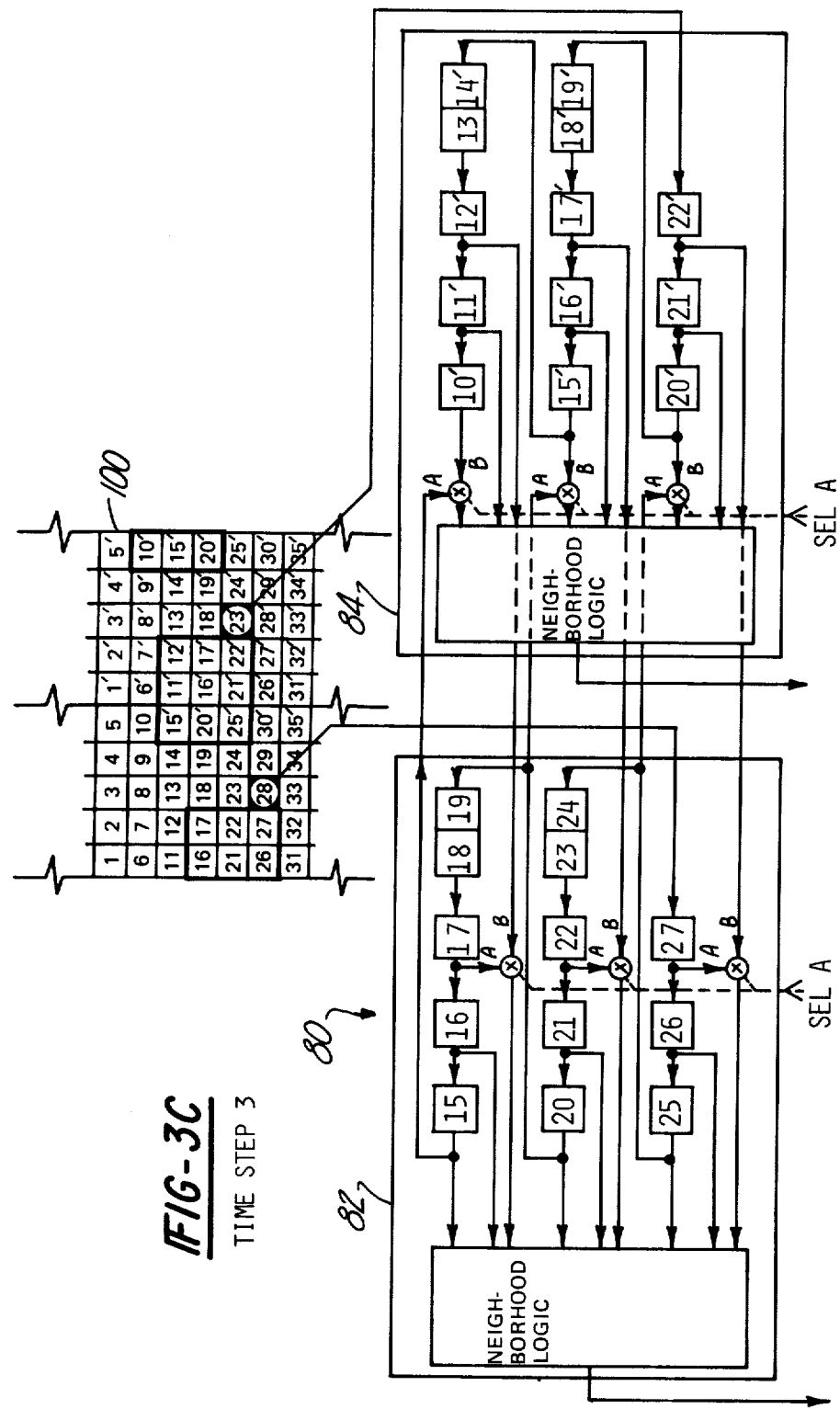
Figure 3D:
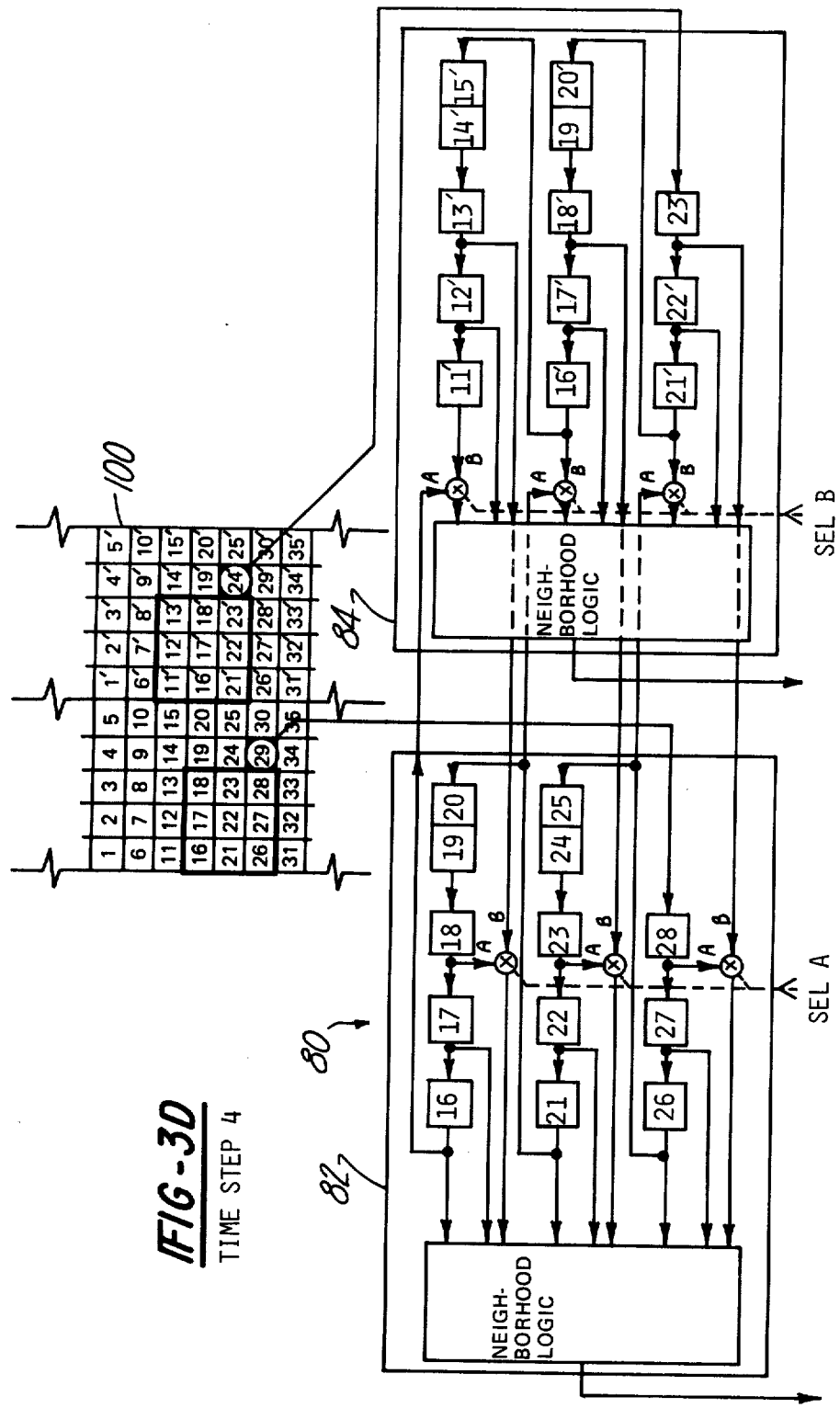
Figure 4B:
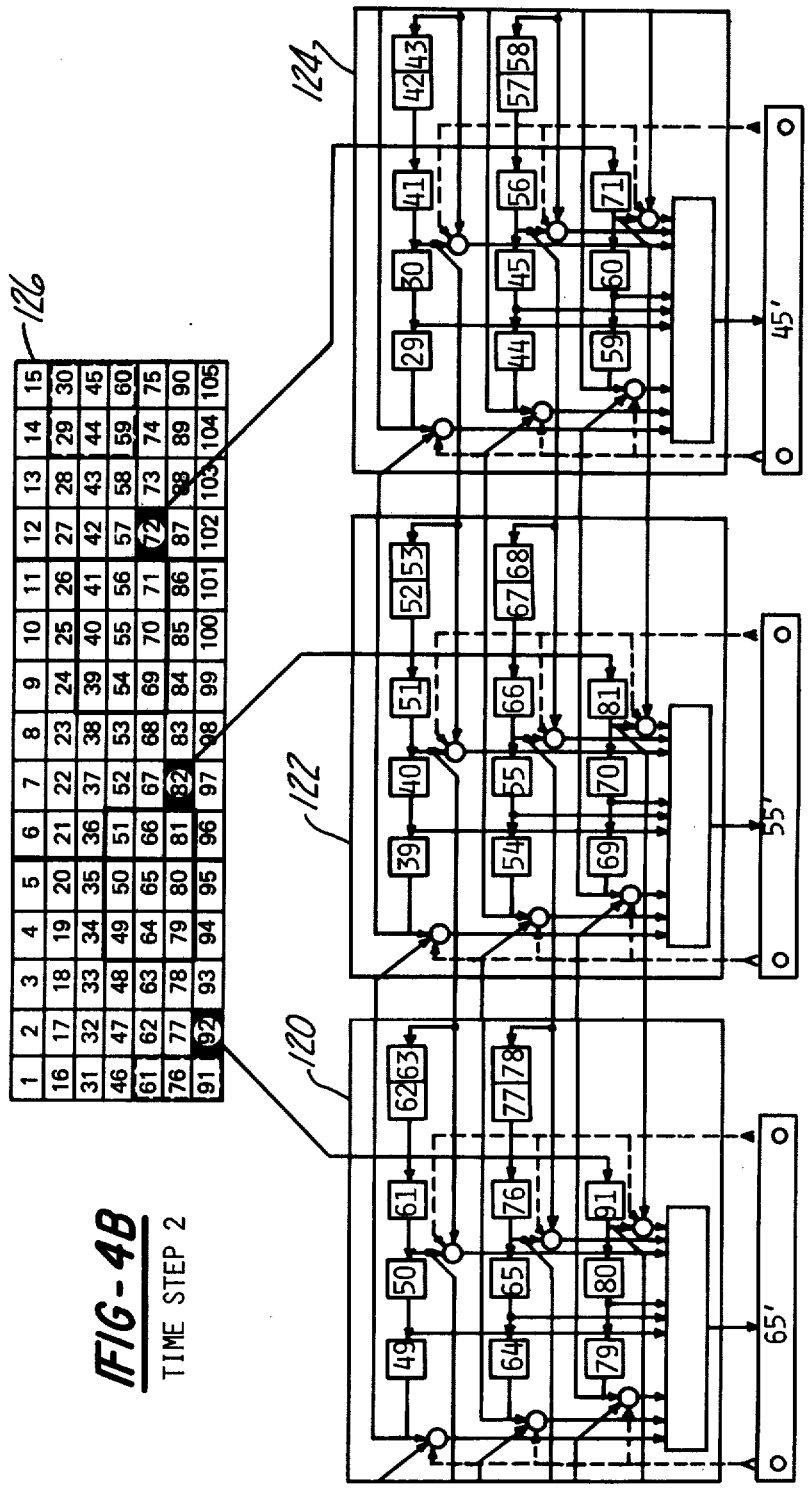
Figure 4C:
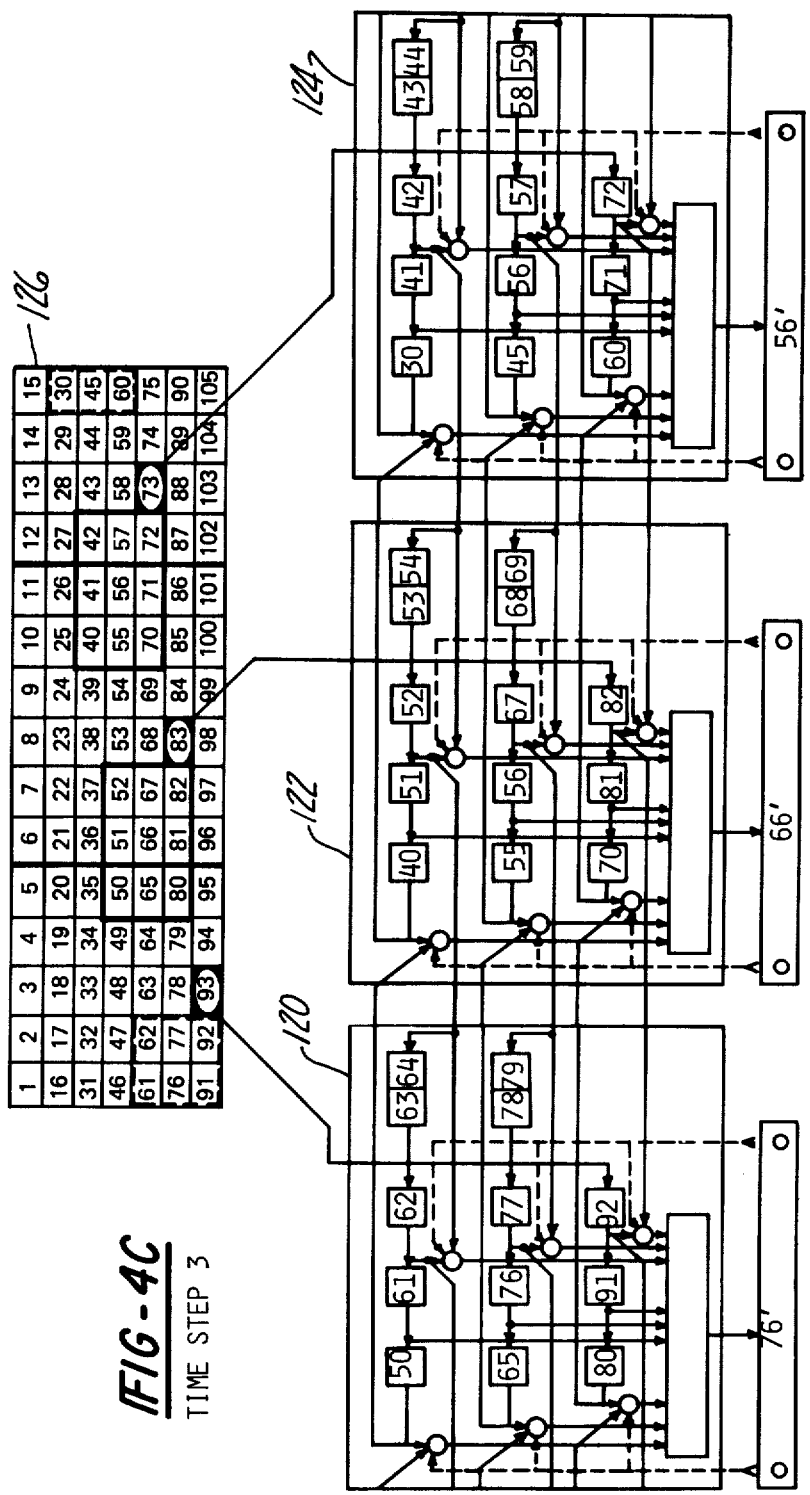
Figure 4D:
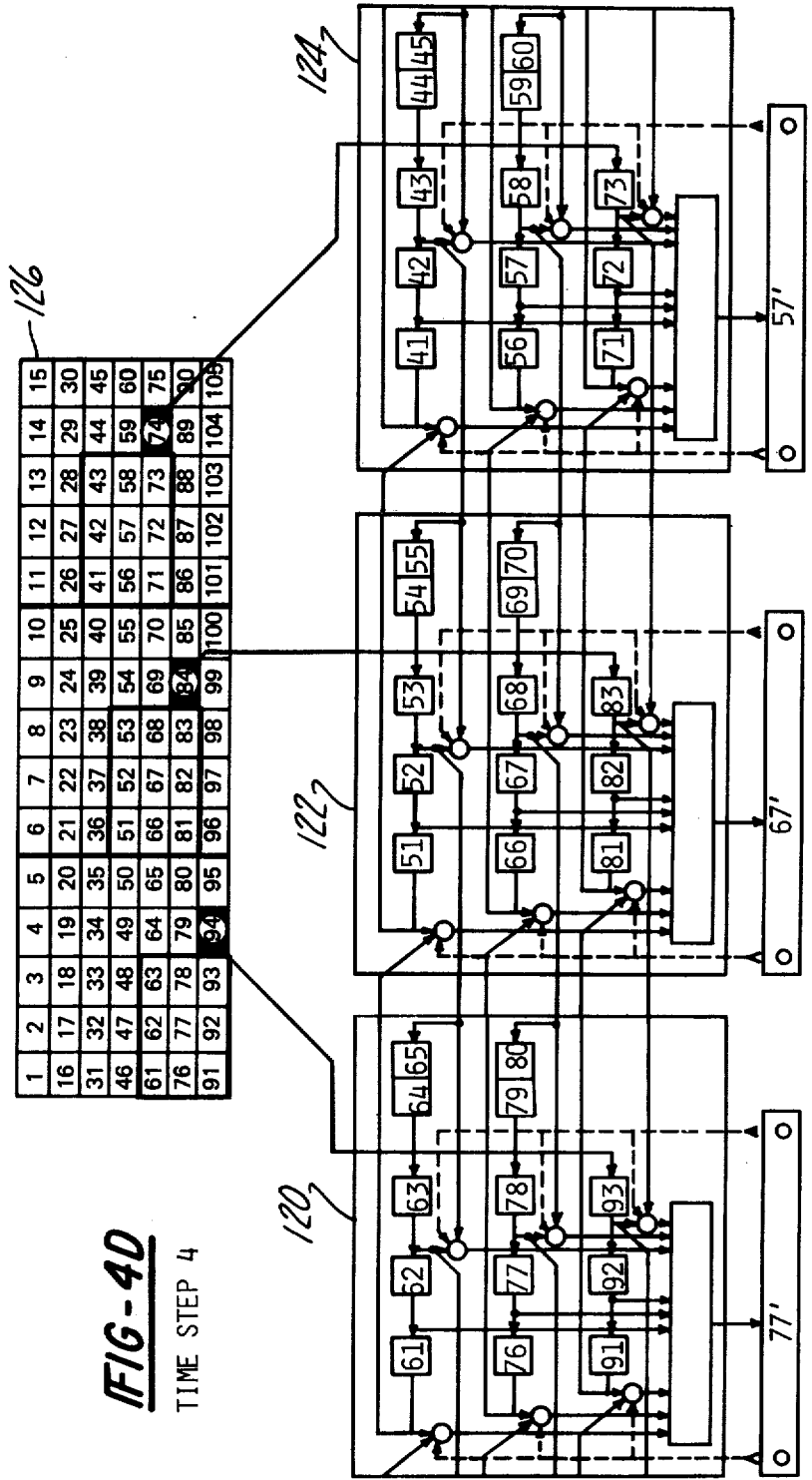

At time step 3, FIG. 3c, the virtual window crosses the array boundary, the pixel being transformed belonging to the right hand array rather than the left-hand array. The inputs to the stage 84 neighborhood logic translator are therefore taken partially from stage 84 window registers, as is the case for pixels 11', 12', 16', 17', 21' and 22', and partially laterally transferred from the window registers of stage 82, i.e. pixels 15, 20, 25. The multiplexer select input of stage 84 is now set at position A. The output of stage 84 is the transformed value of pixel 16'. Time step 4, FIG. 3d, represents a return to the normal condition of the on-stage multiplexers. The virtual window configuration is now real, being totally contained within the neighborhood window registers of stage 84.

It should be apparent to one skilled in the art that a matrix can be partitioned into any equal divisor of the number of columns in the matrix. When the division involves more than two processors, all of the processors except those operating on the edge of the matrix will require connections from both of their adjacent neighbor processors. FIG. 4 illulstrates three identical partitioned neighborhood processor modules 120, 122 and 124, all operating on sections of a single 15 pixel wide matrix 126.

The processor 120 receives the left-hand five columns of the matrix 126, the middle processor 122 receives the central five columns and the processor 124 receives the right-hand five columns. The rasters of each group of matrix columns are staggered by one row relative to one another for adjacent processors. The processor 122 has inputs from window register stages of the processors 120 and 124 and the processors 120 and 124 in turn each have inputs from the processor 122. The three processor modules are identical but certain of the multiplexers of the processors 120 and 124 are not used. (those that would connect to adjacent left and right hand processors).

Each serial neighborhood processor module, like the processors of the previous examples, operate upon a 3×3 neighborhood window and accordingly employ nine window register sections 128a–i. Since each processor handles five columns it must incorporate a pair of two-stage shift registers 130a and 130b. The outputs of the three window registers 128b, 128e and 128h forming the middle column of the three columns of the window are provided directly to a neighborhood logic translator 132. The three window registers 128c, 128f and 128i forming the left column of each window are provided to three multiplexers 134a, 134b and 134c. These multiplexers each have a second input from the adjacent left processor. In the case of processor 120 which operates on the left-hand edge of the matrix 126, these inputs are not connected. The three window registers forming the right-hand column of each window, 128a, 128d and 128g are provided to a second set of three multiplexers 136a, 136b and 136c. These multiplexers each have a second input from window registers of the next processor to the right. Each processor is provided with its own multiplexer control unit 138.

Each section of the segmented processor illustrated in FIG. 4 is simultaneously fed a serial pixel stream from the partitioned matrix, the phase of each pixel stream being delayed one row preceding from the left array segment to the right array segment. At time step 1, illustrated in FIG. 4a, the contents of the window registers of each stage segment corresponds to neighborhood windows which are entirely contained within their respective array segments. All multiplexer input signals are therefore zero.

Window configurations cross array segment boundaries at time step 2 (FIG. 4b), thus creating virtual windows. The stage 120 obtains pixels 51, 66 and 81 from stage 122 for computation of segment output 65', and the MPX2 control input as the active one. Similarly, stage 122 picks up pixels 41, 56 and 71 from stage 124, thus its MPX2 control input is the active one. The stage 124 MPX2 control input is permanently tied to inactive zero because it has no right hand neighboring segment. The window configuration of the right hand segment is disjoint and special provision must be made for proper handling of the edge condition. The simplest adjustment from a control standpoint that could be made would be to feed the MPX2 control signal into the stage 124 neighborhood logic module. This would have the effect of causing the right hand segment neighborhood logic to ignore pixels 41, 56 and 71 which are disconnected.

At time step 3 a left-hand symmetry exists with the conditions illustrated at time step 2. Multiplexer control input MPX1 is therefore active one while MPX2 is non-active zero. Finally, at time step 4, FIG. 4d, the normal operating condition reoccurs, with the window configuration being entirely contained in their respective array segments.

The outputs of each of the serial processors joined to form a segmented processor could be provided to additional processor stages which would perform the next transformation in a cyclical manner. Any number of processors can be cascaded in this manner.

The embodiments of the invention in which an exclusive property or privilege is claimed are defined as follows:

1. Apparatus for generating a transformation of a first data matrix to form a second data matrix wherein the value of each data element is a function of the values of the elements in the neighborhood of the equivalent data element in the first matrix, comprising:

a plurality of serial neighborhood processors;

means for providing said first data matrix to said plurality of serial neighborhood processors with each serial processor receiving a plurality of adjacent columns of the matrix in a row by row raster;

connections between adjacent serial processors; and means for controlling the serial processors to cause them to each utilize neighborhood information stored in an adjacent processor when generating the transform of a data element having neighboring elements in the columns processed by such adjacent processor, whereby said plurality of serial processors can simultaneously process separate and adjacent columns of the same matrix.

2. The apparatus of claim 1 wherein said means for providing said first data matrix to said plurality of processors operates to provide adjacent processors with data elements displaced by at least one row relative to one another.

3. Apparatus for generating a transformation of a first data matrix to form a second data matrix wherein the value of each data element is a function of the values of the elements in the neighborhood of the equivalent data element in the first matrix, comprising:
- a pair of serial neighborhood processors each including a neighborhood register section, associated serial configuring storage means and a neighborhood logic translator;
- means for providing said first data matrix to said pair of serial neighborhood processors with a first plurality of columns of the matrix being provided to the first serial processor in a row by row raster and a second plurality of columns of said data being provided to the second data processor in a row by row raster;
- connections between the window sections of the first serial processor and the translator of the second processor, and between the window sections of the second serial processor and the translator of the first serial processor;
- and means for controlling the serial processor to cause them each to utilize neighborhood information contained in the window register section of the opposite serial processor when generating the transform of a data element having neighboring elements in the columns processed by the opposite serial processor, whereby said serial processors can simultaneously process separate and adjacent columns of the same matrix.

4. The apparatus of claim 3 wherein said means for providing said first data matrix to said pair of serial neighborhood processors includes means for providing one data element at a time to each processor simultaneously, with the data element provided to one processor being displaced within the matrix by at least one row with respect to the data element simultaneously provided to the other processor.

5. The apparatus of claim 3 wherein said means for controlling the serial processors to cause them to utilize neighborhood information contained in the window register section of the opposite serial processor includes gate means forming part of each processor operative to receive one input from a window section of each processor and control means for providing one of such inputs as an output of the gate means.

6. The apparatus of claim 5 wherein the output of the gate means forming part of each processor is connected to the neighborhood logic translator of that processor so that the neighborhood logic translator simultaneously receives signals representative of all of the data elements in the neighborhood of the data element being translated.

7. Apparatus for generating the transformation of a first data matrix to form a second data matrix wherein the value of each data element is a function of the values of the elements in the neighborhood of the equivalent data element in the first matrix, comprising:
- a pair of serial neighborhood processors;
- means for providing a first portion of said first data matrix to one of said serial neighborhood processors in a serial manner and for providing a second contiguous portion of said first data matrix to the other of said serial neighborhood processors in a serial manner;
- each serial processor sequentially accessing a neighborhood window subset of the first data matrix for performing the transformation thereof, said neighborhood window including a central data element and its surrounding data elements in the matrix; and
- means for transferring selected data elements from one of the processors to the other when said other processor is transforming a central data element in a neighborhood window containing surrounding elements in the matrix portion provided to said one processor, whereby said other processor may generate said transformation of the central data element even though some of its surrounding data elements in the window are in said second matrix portion associated with said one processor.

8. The apparatus of claim 7 wherein said means for providing portions of the first data matrix to said pair of serial neighborhood processors provides each portion in a row by row raster.

9. The apparatus of claim 8 wherein the row by row raster provided to one serial neighborhood processor is delayed by at least one row with respect to the row by row raster provided to the other serial neighborhood processor.

10. The apparatus of claim 7 wherein said transferring means includes gate means forming part of each processor operative to receive two inputs, one from each processor, and control means for providing one of said inputs as the output of the gate means.

11. The apparatus of claim 7 wherein each serial processor includes a neighborhood register section, associated serial configuring storage means, and a neighborhood logic translator.

12. The apparatus for claim 11 wherein each serial processor has the same window configuration and operates on the same number of data matrix columns.

13. The apparatus of claim 11 wherein each serial neighborhood processor is formed as a single integrated circuit and each of the circuits is identical to one another.

14. The apparatus of claim 7 further including third and fourth serial neighborhood processors of identical configurations to said first and second neighborhood processors respectively connected to the outputs of said first and second neighborhood processors respectively so as to perform a second transformation on the matrix represented by the output of the first and second processors.

* * * * *